United States Patent [19]

McNab

[11] Patent Number: 4,927,039
[45] Date of Patent: May 22, 1990

[54] ELECTRICAL BOX
[75] Inventor: Wayne McNab, Ladner, Canada
[73] Assignee: Viscount Industries Limited, Vancouver, Canada
[21] Appl. No.: 378,920
[22] Filed: Jul. 12, 1989
[51] Int. Cl.⁵ .............................................. H02G 3/12
[52] U.S. Cl. ......................................... 220/3.7; 174/57
[58] Field of Search .......................... 220/3.7, 3.9, 3.92, 220/3.94, 3.2; 174/57, 58

[56] References Cited

U.S. PATENT DOCUMENTS

| | | | |
|---|---|---|---|
| 537,182 | 4/1895 | Brown | 220/3.7 |
| 1,509,288 | 9/1924 | Fralick | 220/3.9 |
| 2,622,756 | 12/1952 | Appleton | 220/3.94 |
| 2,930,504 | 3/1960 | Hudson | 220/3.7 |
| 3,027,416 | 3/1962 | Kissel | 220/3.7 |
| 3,226,472 | 12/1965 | Barnstead | 174/57 |
| 3,288,910 | 11/1966 | Zerwes | 220/3.7 |
| 3,878,315 | 4/1975 | Blush | 220/3.7 |
| 3,955,701 | 5/1976 | Fisch | 220/3.7 |
| 4,673,097 | 6/1987 | Schuldt | 220/3.9 |

Primary Examiner—George E. Lowrance
Attorney, Agent, or Firm—Shlesinger & Myers

[57] ABSTRACT

An electrical box for use in building electrical systems, telephone wiring, cable systems and similar applications including a receptacle with an open front face and a cable hole, a receptacle attachment removably affixable to the receptacle and a flange on the receptacle attachment spaced from the faces thereof a pre-selected distance equal to an associated wall covering thickness. Holes in an extended portion of the flange are used to affix the box to a wall frame member.

13 Claims, 4 Drawing Sheets

ELECTRICAL BOX

BACKGROUND

The present invention relates to outlet or switch boxes as are used in electrical house wiring systems, telephone wiring installations, cable systems and similar applications.

Outlet boxes are normally installed by nailing them to studs such that the front edge of the box is about ½ inch beyond the stud surface so that the front edge of the box is flush with ½ inch wallboard which is installed over the studs. In some cases it is necessary to readjust the outlet box in order that its front edge be flush with the outer wall as, for example, in the event tile is affixed to the wallboard.

In some cases contractors apply a double layer of wallboard to achieve enhanced wall strength and sound insulation. In such cases the outlet box must be detached and then moved forward in order to be flush with the interior wall surface.

A second problem in using outlet boxes in outside walls lies in the building code requirement such boxes must have vapour barrier protection. One current practice is to use a plastic box to fit over the back of an outlet box. Holes are punched through the box to allow the passage of wire or cable and the holes are then sealed with a caulking compound around the cable.

Accordingly, it is an object of the invention to provide an improved outlet box. It is a further object of the invention to provide an outlet box that is capable of adjustment to allow for various wall thickness. It is yet a further object of the invention to provide an outlet box that is a barrier to the transmission of air and vapour into or around the box.

SUMMARY OF THE INVENTION

According to the invention there is provided an electrical box for use in building electrical wiring systems, cable systems or telephone wiring systems which includes a receptacle having an open front face and admitting means in one of the walls for allowing a wire or cable to pass into the interior of the receptacle. A receptacle attachment is removably affixable to the open front face of the receptacle so as to abut the latter around its perimeter. A flange is affixed to an exterior surface of the attachment encircling the latter at a pre-selected distance from first and second faces thereof equal to pre-selected first and second wall covering thickness. Means are provided for affixing the attachment to the receptacle with either the first or second face juxtaposed to the receptacle and for attaching the flange to a wall frame.

A plurality of holes may be provided in the flange so that the latter can be nailed or screwed to a wall frame member.

An extendor of a pre-selected width may also be provided which is dimensioned to conform to the first and second faces of the attachment and be removably affixable thereto for adjusting the distance from the flange to the first and second faces of the attachment.

By providing a flange around the receptacle attachment, the flange in combination with the receptacle and a tight joint between the receptacle and the attachment combines to provide a barrier to transmitting air and moisture through or around the box to an interior environment. Moreover, by incorporating nail or screw holes in an extended portion of the flange a consistent positioning of the front face of the attachment or extendor with respect to the wall frame may be obtained. The hole left by removal of the frangible plate is dimensioned to fit snugly around a cable and, in addition, is normally sealed with a neoprene rubber sheeting, caulking compound or a combination of the two.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein.

DETAILED DESCRIPTION WITH REFERENCE TO THE DRAWINGS

Figure 1:
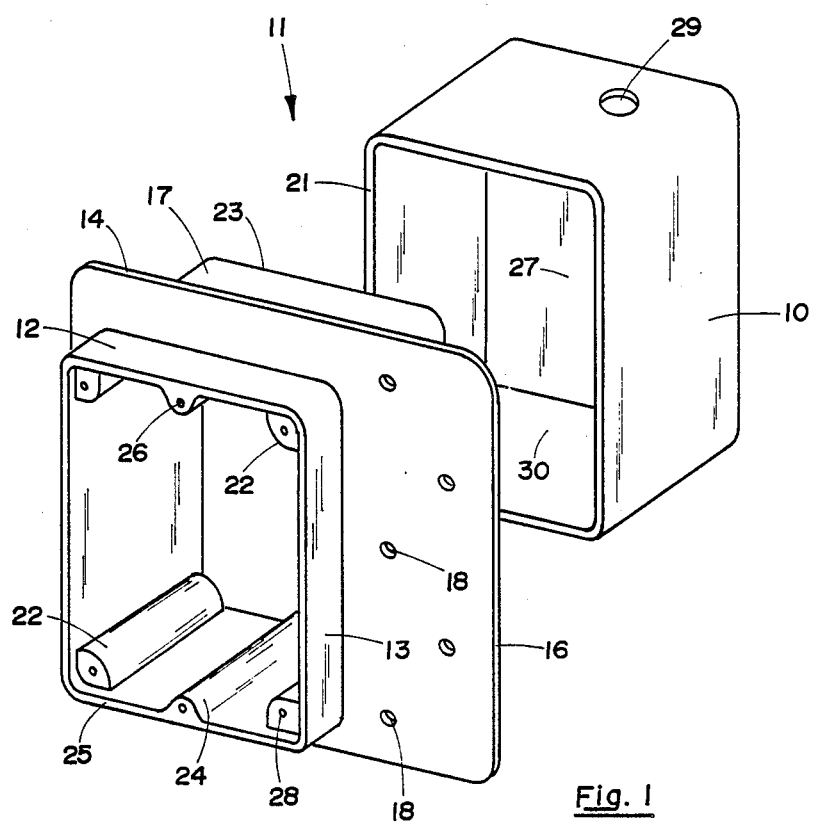
FIG. 1 is a perspective exploded view of a preferred embodiment of the electrical box.
Figure 2:
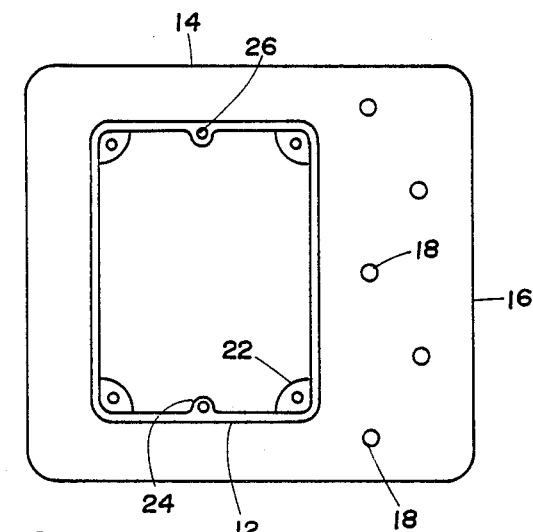
FIG. 2 is a front elevation view of the box of FIG. 1.
Figure 3:
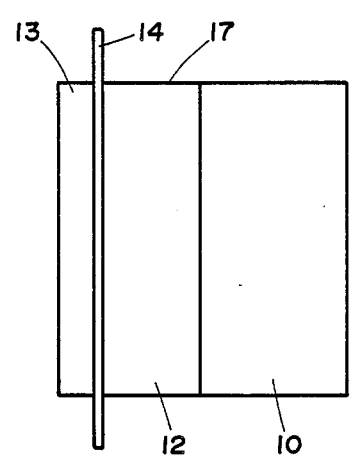
FIG. 3 is a side elevation view of the box of FIG. 1.

Referring to FIGS. 1-4 there is shown an exploded view of the electrical box in accordance with a preferred embodiment of the present invention which includes a receptacle 10 closed at one face and open at another 21. Four corner blocks 20 are located at respective corner edges of the box with each block having a threaded screw hole 27. A trough 30 is located centrally of each of the top and bottom walls of receptacle 10. A cable aperture 29 is provided on a top wall of receptacle 10 to permit snug passage of an electrical cable (not shown) snugly therethrough.

A receptacle attachment 12 has rectangular first 23 and second 25 faces each dimensioned to abut an open face of receptacle 10. A flange is integral with the walls of the attachment 12 and is spaced pre-selected distances from the first 23 and second 25 faces thereof. The width of strip 13 between the flange 14 and second face 25 is ½ inch to match a typical thickness of wall board while that of strip 17 is 1 inch to equal that of a double thickness of such wallboard. Flange 14 has an extended portion 16 with a plurality of nail holes 18 spaced thereover.

On top and bottom walls of the attachment 12, centrally thereof are two thickened elongated ribs 24 each having a threaded screw hole 26 therethrough so that a standard electrical outlet or switch device (not shown) may be attached. At each corner edge is a corner block 22 with a bore 28 therethrough dimensioned to pass through a screw (not shown) that is of a size to engage the threads of holes 27.

Figure 4:
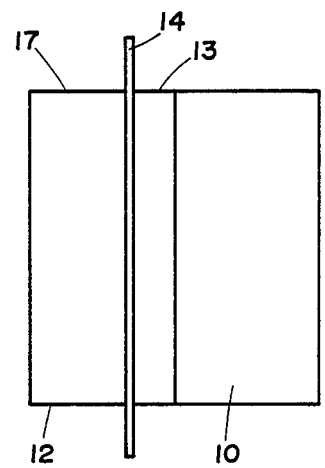
FIG. 4 is a side elevation view of the box of FIG. 1 but with the attachment reversed.
Figure 5:
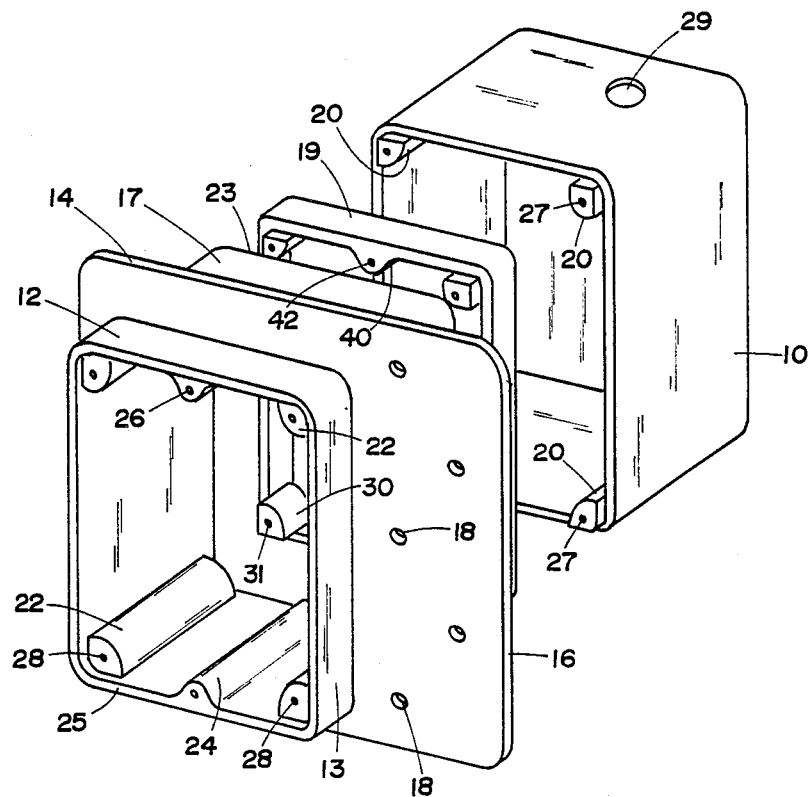
FIG. 5 is a perspective view of the box with an extendor.
Figure 6:
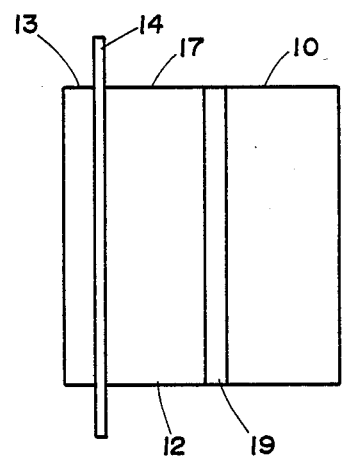
FIG. 6 is a side elevation view of the box of FIG. 5 unexploded.

Depending on the thickness of wall covering to be accommodated either first face 23 or second face 26 abuts the open face of receptacle 10. FIG. 4 shows the configuration for use with a ½ inch of wall covering while FIG. 4 is used for a 1 inch covering.

Figure 7:
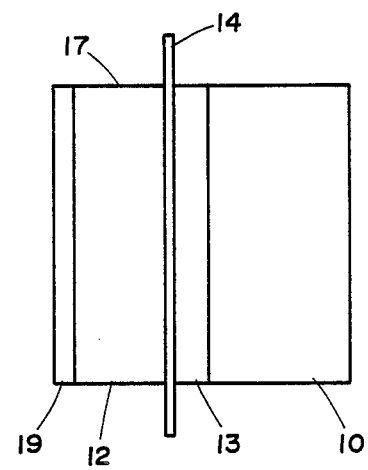
FIG. 7 is a side elevation view of the box of FIG. 5 with the extendor in place in front of the attachment.
Figure 8:
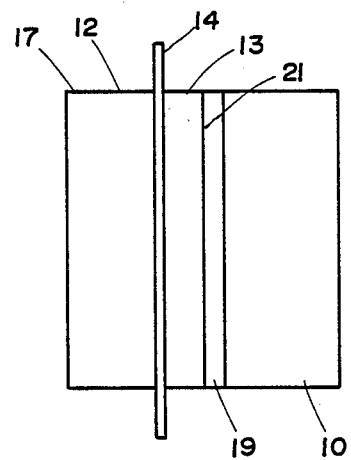
FIG. 8 is a side elevation view of the box of FIG. 5 with the attachment reversed from that shown in FIG. 6.
Figure 9:
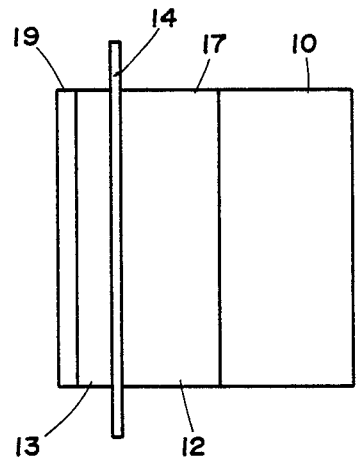
FIG. 9 is a side elevation view of the box of FIG. 5 with the extendor in front of the attachment.

A variant of the preferred embodiment is shown in FIGS. 5 to 9 in which an extendor 19 identical in cross section to attachment 12 is positioned between receptacle 10 and attachment 12. Extendor 19, as seen in FIGS. 6 to 9 is positionable either between attachment 12 and receptacle 10 or in front of attachment 10 as seen in FIGS. 7 and 9. In addition, attachment 12 may have strip 13 facing outwardly as in FIGS. 6 and 9 or toward receptacle 10 as in FIGS. 7 and 8. In all there are 4 combinations of positions which give four different depths from the front of the box to the flange 14 corresponding to four different possible thicknesses of wall coverings. Extendor 19 has corner blocks 30 located at each corner, each with a clearance hole 31 and a rib 40 centrally on the top and bottom walls with a clearance hole 42.

With the extendor 19 positioned in front of attachment 12, screws passing through clearance holes 42 in ribs 40 and threadedly received by holes 26 in ribs 24 secure the extendor 19 to attachment 12.

With the extendor 19 positioned between attachment 12 and receptacle 10, screws pass through clearance holes 28 and 31 in blocks 22 and 30, respectively, and are engaged with the threads of threaded hole 27 to hold both attachment 12 and extendor 19 securely in place against receptacle 10.

Figure 10:
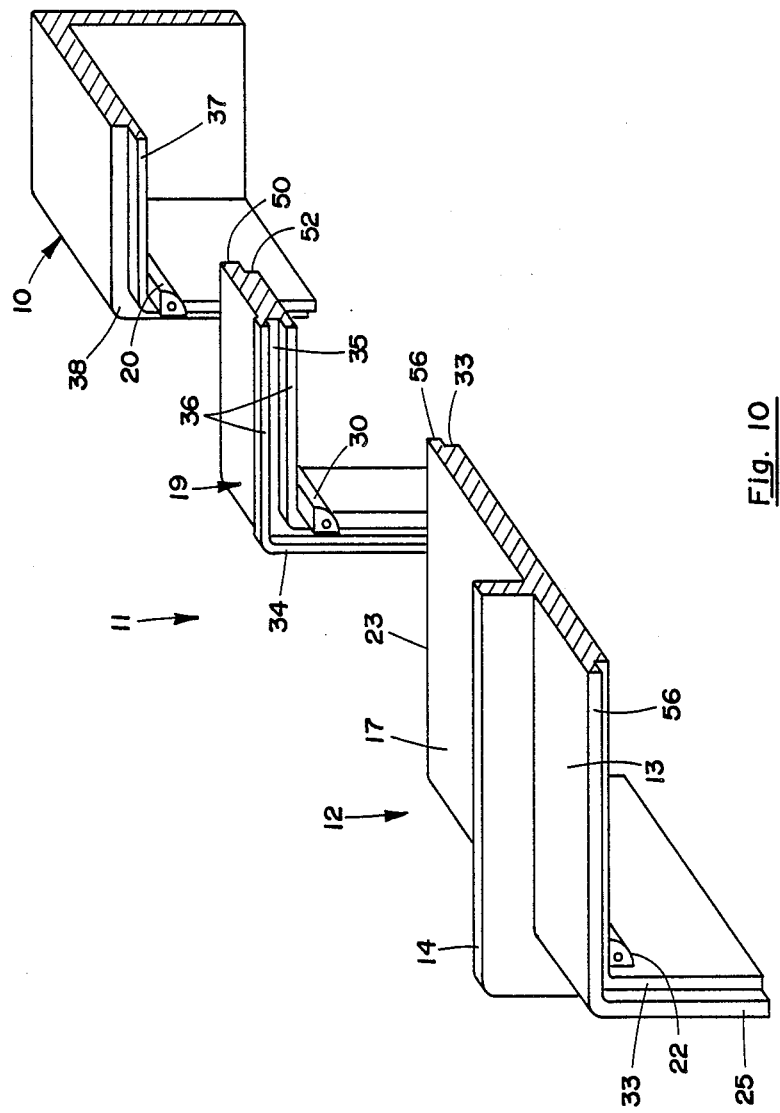
FIG. 10 is an exploded perspective partial view of the box of FIG. 5 showing the faces of the attachment, extendor and receptacle 10 in detail.

FIG. 10 shows the detailed structure of the faces of the attachment 12, extendor 19 and receptacle 10. Both faces 25 and 23 of attachment 12 have an inner recess 33 and an outer projecting lip 56. Extendor 19 has an attachment facing side 34 with a central recess 35 formed by lips 36 on either side thereof to receive lip 56 of either face 23 or 25 and maintain extendor 19 in alignment without bowing of the sides. In addition, block 30 projects so as to abut recessed attachment block 22. Face 50 of extendor 19 also has an inner recess 52 to receive an inner projecting lip 37 on face 38 of receptacle 10. Projecting block 20 abuts either the recessed face of block 30 of extendor 19 or one of those of block 22. Box 11 is made of molded plastic.

Once the desired depth from the front of the box 11 to flange 14 is selected, extended portion 16 of flange 14 is nailed by nails (not shown) passing through holes 18 into a wall stud (also not shown).

When in place wall board (not shown) is positioned over flange 14 abutting strip 13 if second face 25 faces outwardly of the receptacle 10 and strip 17 if first face 23 faces outwardly of receptacle 10.

Obviously, other means of interconnecting the attachment 12 and receptacle 10 may be envisioned such as spring arms on one engaging a slot on another. Cable aperture 29 can be caulked once an electrical cable (not shown) is passed therethrouqh. The caulking compound may be silicone or neoprene rubber sheet or both.

Accordingly while this invention has been described with reference to illustrative embodiments, this description is intended to be construed in a limiting sense. Various modifications of the illustrative embodiments, as well as other embodiments of the invention, will be apparent to persons skilled in the art upon reference to this description. It is therefore contemplated that the appended claim will cover any such modifications or embodiments as fall within the true scope of the invention.

I claim:

1. An electrical box for use in building electrical wiring systems, telephone wiring systems, cable television or other similar systems, comprising:
   (a) a receptacle having an open front face;
   (b) admitting means for permitting passage into an interior of said receptacle of a wire or cable;
   (c) a receptacle attachment removably affixable to the front face of said receptacle;
   (d) a flange affixed to an exterior surface of said receptacle attachment encircling the latter and spaced apart from open first and second opposite faces thereof a pre-selected distance equal to first and second pre-selected wall covering thicknesses;
   (e) means for affixing said attachment to said receptacle with either the first or second face juxtaposed to said receptacle; and
   (f) means for attaching said flange to a wall frame.

2. An electrical box according to claim 1, wherein said flange includes an extended portion with a plurality of holes for permitting passage therethrough of fastening elements for affixing said extended portion to a wall frame member.

3. An electrical box according to claim 1, wherein said affixing means includes a plurality of receptacle blocks affixed to said receptacle each having a threaded screw hole and a plurality of attachment blocks affixed to said attachment each having a screw clearance hole corresponding to an associated threaded screw hole for screwing said attachment to said receptacle.

4. An electrical box according to claim 1, wherein said attachment is rectangular in cross-section and has a pair of screw receptacles positioned centrally on top and bottom walls thereof on both the first and second faces thereof.

5. An electrical box according to claim 3 including an extendor of a pre-selected width and dimensioned to abut the first and second faces of said attachment and to be affixable thereto so as to adjust the distance from the flange to each of the first and second faces.

6. An electrical box according to claim 1, wherein said admitting means is an aperture in a wall of said receptacle dimensioned to permit passage therethrough of a wire or cable.

7. An electrical box according to claim 3, wherein the receptacle blocks are affixed to said receptacle at inside corner edges thereof and protruding beyond a front face thereof and the attachment blocks are affixed to inside corner edges of said attachment recessed at both ends from faces thereof an amount such that on abutment with said receptacle, said receptacle blocks abut corresponding ones of the attachment blocks.

8. An electrical box according to claim 5, wherein said extendor has a screw clearance hole on the top and bottom walls thereof and said attachment has threaded screw receptacles positioned centrally of the top and bottom walls on both the first and second faces of said attachment in alignment with corresponding ones of the extendor screw clearance holes.

9. An electrical box for use in electrical, telephone, cable television or other similar building wiring systems, comprising:
   (a) a receptacle with an open front face, side and end walls;
   (b) means for admitting a wire or cable through one of said side and end walls;

(c) a receptacle attachment having side walls and first and second opposed open faces each mating with the front face of said receptacle;
(d) a flange encircling side walls of said attachment spaced preselected distances from the first and second open faces corresponding to first and second wall covering thicknesses said flange having an extended portion with a plurality of fastener holes spaced thereover;
(e) means for removably affixing said attachment to said receptacle with either the first or second open face of said attachment abutting the open face of said receptacle; and
(f) means for affixing an electrical or telecommunications outlet proximate either the first or second faces of said attachment.

10. An electrical box according to claim 9, wherein said attachment affixing means is a plurality of blocks affixed to inside side edges of said receptacle each with a threaded hole and projecting out from an open face thereof and a corresponding plurality of blocks affixed to inside side edges of said attachment and recessed from said first and second faces thereof and each of said blocks having a clearance screw hole such that one of said first and second attachment faces abuts the receptacle face, and said attachment blocks abut and align with said receptacle blocks.

11. An electrical box according to claim 10, including an extendor having one face mating with said first and second attachment faces and another with said receptacle and removably affixable to first and second faces of said attachment or removably positionable intermediate said attachment and said receptacle.

12. An electrical box according to claim 9, wherein said admitting means is an aperture in a wall of said receptacle.

13. An electrical box according to claim 11, wherein the cross section of each of said receptacle, attachment and extendor is rectangular.

* * * * *